(12) United States Patent
Tekawy et al.

(10) Patent No.: US 7,423,585 B2
(45) Date of Patent: Sep. 9, 2008

(54) NAVIGATION SIGNAL GROUP DELAY CALIBRATION

(75) Inventors: Jonathan A Tekawy, Newport, CA (US); Kevin M O'Brien, San Diego, CA (US)

(73) Assignee: The Boeing Company, Chicago, IL (US)

( * ) Notice: Subject to any disclaimer, the term of this patent is extended or adjusted under 35 U.S.C. 154(b) by 57 days.

(21) Appl. No.: 11/420,420

(22) Filed: May 25, 2006

(65) Prior Publication Data

US 2007/0273580 A1 Nov. 29, 2007

(51) Int. Cl.
*G01S 5/14* (2006.01)
(52) U.S. Cl. ............. 342/358; 342/357.02; 342/357.09; 342/174
(58) Field of Classification Search ................ 342/358, 342/174, 357.02, 357.03, 357.09
See application file for complete search history.

(56) References Cited

U.S. PATENT DOCUMENTS 7,221,317 B2 5/2007 Tekawy et al.

OTHER PUBLICATIONS

K. Kovach, New User Equivalent Range Error (UERE) Budget for the Modernized Navstar Global Positioning System (GPS), Proceedings of the Institute of Navigation National Technical Meeting, p. 550-573, Jan. 2000.*

D.S. Coco et al., Variability of GPS satellite differential group delay biases, IEEE Transactions on Aerospace and Electronic Systems, vol. 27(6), p. 931-938, Nov. 1991.*

Tekawy, et al., "Lever Arm Correction via Curve Fitting for High Accuracy Navigation: Space Segment Approach", Boeing Invention Disclosure, Mar. 3, 2005, 21 pages.

Takawy, "Precision Spacecraft Attitude Estimators Using an Optical Payload Pointing System", Journal of Spacecraft and Rockets, vol. 35, No. 4, Jul.-Aug. 1996, 7 pages.

Yinger, et al., "GPS Satellite Interfrequency Biases", ION 55th Annual Meeting, Jun. 1999, pp. 347-354.

* cited by examiner

*Primary Examiner*—Thomas H. Tarcza
*Assistant Examiner*—Fred H. Mull
(74) *Attorney, Agent, or Firm*—Lee & Hayes, PLLC

(57) ABSTRACT

Navigation signal group delay calibration methods and systems are described. In an embodiment, a code signal generated in a navigation system platform can be measured where the code signal includes timing delay(s). An additional code signal generated in the navigation system platform can be measured where the additional code signal is designated as a timing reference signal. A differential group delay between the code signal and the timing reference signal can the be mathematically estimated in the navigation system platform to correct for an inaccurate position estimation that would result from the timing delay(s).

20 Claims, 5 Drawing Sheets

NAVIGATION SIGNAL GROUP DELAY CALIBRATION

TECHNICAL FIELD

The present disclosure relates to navigation signal group delay calibration.

BACKGROUND

Navigation systems, such as the global positioning system (GPS) and the global navigation satellite system (GNSS) are relied upon to provide positioning information that is as accurate as possible, especially for military aircraft and weapon systems applications and for civilian aviation. Inaccurate positioning information can result in less accurate navigation-guided weapons which may increase collateral damage as well as a need for an increased number of weapons needed to accomplish a given mission. Additionally, civilian aviation applications rely on GPS/GNSS positioning information to be highly accurate for aircraft navigation.

A next generation or version of GPS that is being developed is GPS III which has a higher accuracy requirement, yet includes design considerations that may affect this higher accuracy requirement. In particular, GPS III is implemented with a steerable spot beam antenna (SBA) that introduces sources of error not previously considered. Accordingly, the design of GPS III needs to take into consideration these error sources for the higher accuracy requirement of the GPS III system.

The signals transmitted by GPS/GNSS satellites are expected or assumed to travel at exactly the speed of light by GPS/GNSS-enabled receivers employed by users of the navigation positioning systems. A GPS/GNSS receiver can receive signals transmitted by a GPS/GNSS satellite and can then measure the time that it takes for the signals to be generated and travel from the satellite to the receiver. Signal travel times multiplied by the speed of light should yield the distance between the satellite and the receiver, and these distances, called pseudo-ranges and determined for signals from at least four satellites, are then used by the receiver to compute the exact position of the mobile receiver.

Clearly any additional time or delay of a GPS/GNSS code signal being generated in a GPS/GNSS satellite will introduce a positioning error when the signal travel time is determined at a receiver. The signal receiving device only measures the signal travel time and will determine the additional time or signal generation delay as an increase in the distance between the satellite and the receiver, referred to as a ranging error. These types of timing delays are collectively referred to as a group delay which can be a culmination of various timing delays introduced into the system by a variety of sources. For example, the timing delays can be a result of any one or combination of different hardware implementations, different lengths of cabling within a satellite, antenna differences, thermal and orbital variations of the satellite as well as other environmental effects, and variations in manufacturing and calibrations which can all contribute to group delay.

A GPS/GNSS satellite can broadcast many different codes and frequencies, such as the Earth coverage GPS code signals: L1C/A, L1C, L2C, L1M, L2M, L1P, L2P and L5; and the spot beam GPS III code signals: L1M and L2M. The group delay for the different GPS/GNSS code signals can be different due to different signal paths in a GPS/GNSS satellite and other effects. For example, the different GPS III code signals L1M and L2M have different cumulative or group delays, and these differences between L1M and L2M are referred to as a differential group delay. The current GPS system uses a complex system to estimate the differential group delay between Earth coverage GPS code signals L1 and L2, for example. A ground station estimates the location of a satellite and transmits or uploads the estimate to the satellite which then provides the location estimate to GPS-enabled receivers to compensate for the L1/L2 differential group delay to within some error.

The newly developed spot beam GPS III code signals L1M and L2M can not be corrected, or compensated for, with the conventional and complex GPS technique. Conventional GPS can compensate for the L1/L2 differential group delay because the L1/L2 signals are Earth coverage GPS code signals that are available at all times to one or more ground-based GPS monitor stations. To the contrary, the spot beam antenna GPS III code signals are only temporarily available to the monitor stations and, as such, no reliable measurements of the M-code signal broadcast by a spot beam antenna can be determined. A spot beam antenna transmission is not wide enough to continuously cover at least one of the several GPS monitor stations located throughout the Earth. Because the existing technique to compensate for group delay relies on receiving and monitoring the GPS satellite signals at all times, the existing technique can not be used for estimating differential group delay of GPS III code signals from a spot beam antenna.

SUMMARY

This summary introduces simplified features and concepts of navigation signal group delay calibration which are further described below in the Detailed Description. This summary is not intended to identify essential features of the claimed subject matter, nor is it intended for use in determining the scope of the claimed subject matter.

In an embodiment of navigation signal group delay calibration, a code signal generated in a navigation system platform can be measured where the code signal includes timing delay(s). An additional code signal generated in the navigation system platform can be measured where the additional code signal is designated as a timing reference signal. A differential group delay between the code signal and the timing reference signal can then be mathematically estimated in the navigation system platform to correct for an inaccurate position estimation that would result from the timing delay(s).

In another embodiment of navigation signal group delay calibration, estimated parameters of a mathematical estimation can be received at a navigation system-enabled receiver from a navigation system platform to correct for an inaccurate position estimation that would result from timing delay(s) inherent in code signals generated in the navigation system platform. A differential group delay between the code signals can be determined at the navigation system-enabled receiver using the received estimated parameters and a curve fit equation. The differential group delay can then be utilized for position accuracy correction of the navigation system platform.

In another embodiment of navigation signal group delay calibration, likely timing delay(s) of code signals generated in a navigation system platform can be predicted prior to the code signals being generated. A differential group delay between a code signal and a timing reference signal can be predicted based on the likely timing delay(s). The differential group delay can be predicted utilizing a mathematical estimation in the navigation system platform to correct for an inaccurate position estimation that would result from the likely timing delay(s).

BRIEF DESCRIPTION OF THE DRAWINGS

Embodiments of navigation signal group delay calibration are described with reference to the following drawings. The same numbers are used throughout the drawings to reference like features and components.

DETAILED DESCRIPTION

Navigation signal group delay calibration methods and systems are described in which embodiments provide for the use of mathematical estimation, such as curve fitting, to estimate a differential group delay between navigation system code signals. The global navigation systems can include the global navigation satellite systems (GNSS), the United States global positioning system (GPS), the Russian GLONASS navigation satellite system, the European Galileo navigation satellite system, and other similar navigation systems.

In an embodiment, code signals can be generated in a navigation system platform and measured. One of the code signals can be designated as the timing reference signal, and a differential group delay between a code signal and the timing reference signal can then be mathematically estimated, such as by utilizing a curve fit estimation, in the navigation system platform to correct for an inaccurate position estimation that would result from timing delay(s) in the code signals. A navigation system platform can include any type of aircraft, satellite, airborne system, or airborne device that incorporates a global navigation system such as GNSS, GPS, GLONASS, Galileo, and other similar navigation systems.

While features and concepts of the described systems and methods for navigation signal group delay calibration can be implemented in any number of different environments, systems, and/or configurations, embodiments of navigation signal group delay calibration are described in the context of the following exemplary environment and system architectures.

Figure 1:
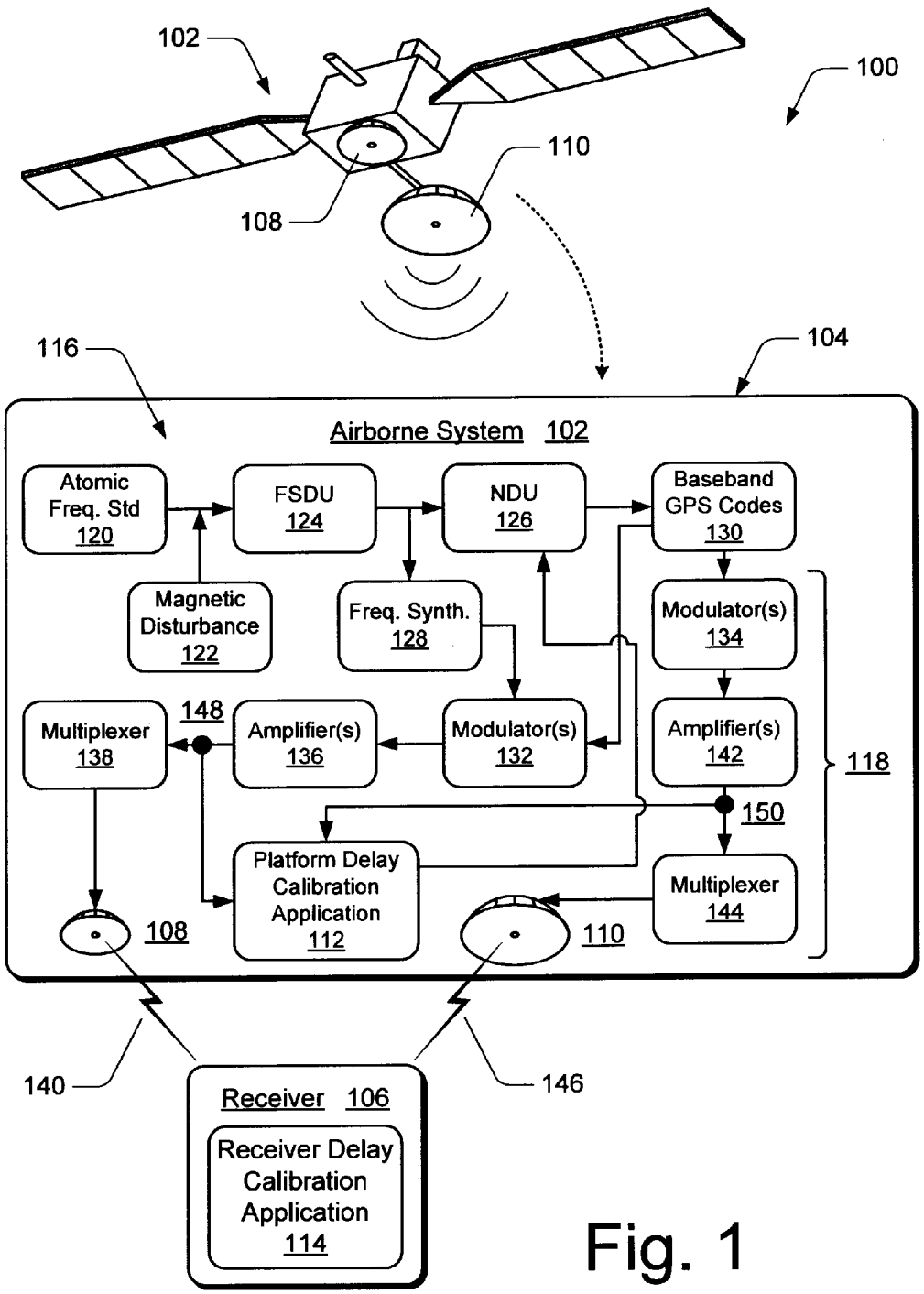
FIG. 1 illustrates an exemplary environment in which embodiments of navigation signal group delay calibration can be implemented.

FIG. 1 illustrates an exemplary environment 100 in which embodiments of navigation signal group delay calibration can be implemented. The environment 100 includes a navigation system platform 102, such as a satellite, aircraft, airborne system, and/or any other type of global navigation device or system. The environment 100 also includes components 104 of the navigation system platform 102, and includes a mobile ground-based or airborne receiver 106. In this example, the navigation system platform 102 is depicted as a GPS or GNSS satellite that includes a wide beam antenna 108 (also referred to as an "Earth coverage antenna"), and includes a spot beam antenna 110 (also referred to as a "steerable" spot beam antenna). The wide beam antenna 108 and the spot beam antenna 110 are each illustrated as antennas of the satellite, and as component antennas of the navigation system platform 102 in the components 104. The antennas 108, 110 transmit global positioning information and navigation messages to navigation system-enabled receivers, such as receiver 106.

The navigation system platform 102 includes a platform delay calibration application 112 (in the components 104) to implement embodiments of navigation signal group delay calibration. Similarly, receiver 106 includes a receiver delay calibration application 114 to implement embodiments of navigation signal group delay calibration at receiver 106. In addition, the system 102 and/or the receiver 106 may be implemented with any number and combination of differing components as further described below with reference to the exemplary computing-based device 500 shown in FIG. 5. For example, the receiver 106 may be implemented as a computing-based device and include any one or combination of the components described with reference to the exemplary computing-based device 500.

The navigation system platform 102 includes components of a wide beam signal generation system 116, to include the wide beam antenna 108, and includes components that are specific to a spot beam signal generation system 118, to include the spot beam antenna 110. Although the system 102 in this example includes components to implement both a wide beam signal generation system 116 and a spot beam signal generation system 118, a navigation system platform 102, such as a satellite, aircraft, and/or any other type of navigation system-enabled device, can be implemented with either one of the signal generation systems individually in an embodiment of navigation signal group delay calibration.

In this example, the components 104 of the system 102 include an atomic frequency standard 120 (e.g., a clock input) and a magnetic disturbance 122 input to a frequency synthesizer data unit 124 that outputs to a navigation data unit 126 and to a frequency synthesizer 128. The navigation data unit 126 provides input(s) to baseband GPS codes 130. Selective ones of the baseband GPS codes 130 are input to one or more modulators 132 of the wide beam signal generation system 116, and to one or more modulators 134 of the spot beam signal generation system 118. For example, the components 104 of the system 102 can include modulators 132 for GPS baseband codes L1, L2, L3, and L5 for the wide beam signal generation system 116. Similarly, the system 102 can include modulators 134 for spot beam baseband codes L1s and L2s for the spot beam signal generation system 118.

Each of the modulators 132 provides an input to respective amplifiers 136, the outputs of which are input to a multiplexer 138 (e.g., a quad-multiplexer in this example) for communication to the wide beam antenna 108 which then transmits a wide beam antenna signal 140 that the receiver 106 can receive. Similarly, each of the modulators 134 provides an input to respective amplifiers 142, the outputs of which are input to a multiplexer 144 (e.g., a di-multiplexer in this example) for communication to the spot beam antenna 110 which then transmits a spot beam antenna signal 146 that the receiver 106 can receive.

The platform delay calibration application 112 in the navigation system platform 102 can receive inputs from probe(s) 148 which monitor outputs of the amplifier(s) 136 of the wide beam signal generation system 116. Alternatively, or in addition, the platform delay calibration application 112 can receive inputs from probe(s) 150 which monitor outputs of the amplifier(s) 142 of the spot beam signal generation system 118. The probes 148, 150 measure the navigation code signals generated in the satellite periodically and/or regularly. In this example, the probes 148, 150 are implemented at the output of the respective amplifiers 136, 142. In an alternate embodiment, the probes 148, 150 can be implemented to measure the navigation code signals at an output of the wide beam antenna 108 and spot beam antenna 110, respectively.

The platform delay calibration application 112 can receive a measurement of a code signal that includes one or more timing delays, and can receive an additional code signal that is designated as a timing reference signal. For the wide beam (or "Earth coverage") signal generation system 116, the timing reference signal can be a wide beam L1P code signal. For the spot beam signal generation system 118, the timing reference signal can be a spot beam L1M code signal. The platform delay calibration application 112 can estimate a differential group delay between the code signal and the timing reference signal by mathematical estimation, such as a sinusoidal curve fit equation, to correct for an inaccurate position estimation that would result from the one or more timing delays.

The receiver 106 may include the same mathematical estimation equation as the navigation system platform 102, such as the sinusoidal curve fit equation. The receiver delay calibration application 114 in the ground-based receiver 106 can then receive an estimated bias of the sinusoid and an estimated amplitude of the sinusoid as part of a navigation message communicated from the satellite to the receiver 106 via the wide beam antenna 108 and/or the spot beam antenna 110. The receiver delay calibration application 114 can then utilize the same sinusoidal curve fit equation, as well as the received estimated bias and estimated amplitude of the sinusoid, to determine the differential group delay for a position accuracy correction.

The navigation system platform 102 and the receiver 106 can each include any number of pre-programmed, generic equations as part of the platform delay calibration application 112 and the receiver delay calibration application 114, respectively. In addition to a sinusoidal curve fit equation, the pre-programmed equations can include a cosine-based curve fit equation, a hyperbolic-based curve fit equation, and the like. Environment 100 and embodiments of navigation signal group delay calibration are described in more detail with reference to methods 200, 300, and 400 shown in respective FIGS. 2, 3, and 4.

Generally, any of the functions described herein can be implemented using software, firmware (e.g., fixed logic circuitry), hardware, manual processing, or a combination of these implementations. A software implementation represents program code that performs specified tasks when executed on processor(s) (e.g., any of microprocessors, controllers, and the like). The program code can be stored in one or more computer readable memory devices, examples of which are described with reference to the exemplary computing-based device 500 shown in FIG. 5. Further, the features of navigation signal group delay calibration as described herein are platform-independent such that the techniques may be implemented on a variety of commercial computing platforms having a variety of processors.

Methods for navigation signal group delay calibration, such as exemplary methods 200, 300, and 400 described with reference to respective FIGS. 2, 3, and 4 may be described in the general context of computer executable instructions. Generally, computer executable instructions can include applications, routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 2:
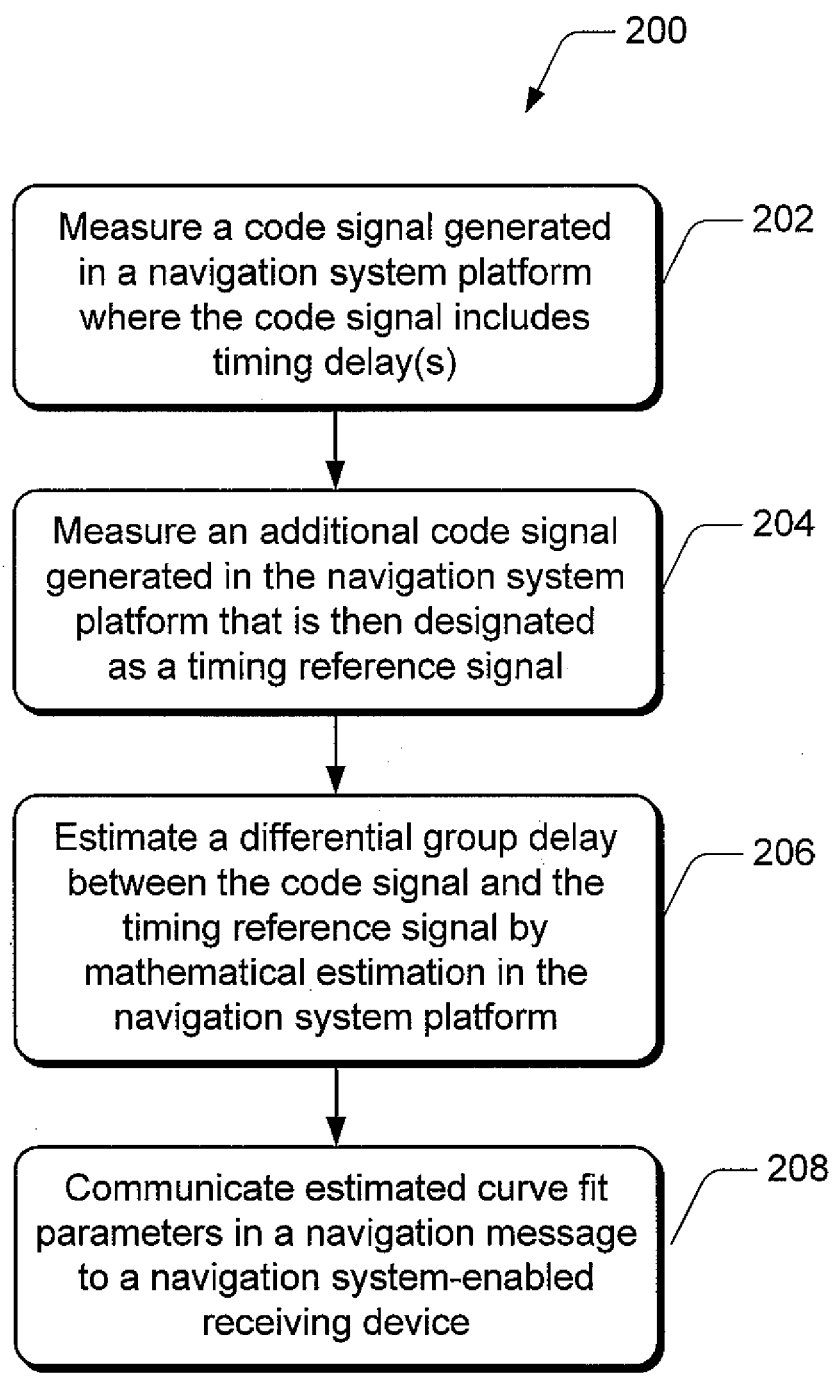
FIG. 2 illustrates exemplary method(s) for navigation signal group delay calibration.

FIG. 2 illustrates an exemplary method 200 for navigation signal group delay calibration and is described with reference to the exemplary environment 100 shown in FIG. 1. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 202, a code signal that is generated in a navigation system platform is measured where the code signal includes timing delay(s). At block 204, an additional code signal that is generated in the navigation system platform is measured where the additional code signal is designated as a timing reference signal. For example, the code signals can be generated in the navigation system platform 102 (FIG. 1) by the wide beam signal generation system 116 and/or by the spot beam signal generation system 118. The timing reference signal can be implemented as an L1P code signal generated by the wide beam signal generation system 116 (e.g., an Earth coverage system), or as an L1M code signal generated by the spot beam signal generation system 118 (e.g., a spot beam system).

At block 206, a differential group delay between the code signal and the timing reference signal is estimated by mathematical estimation in the navigation system platform. For example, the platform delay calibration application 112 estimates the differential group delay to correct for an inaccurate position estimation that would result from the timing delay(s) of the generated signals. The differential group delay between the timing reference signal and the code signal can be estimated utilizing a sinusoidal curve fit equation: $\delta = b + c \sin(\omega t)$, where "$\delta$" is the estimated differential group delay, "b" is an estimated bias of the sinusoid, "c" is an estimated amplitude of the sinusoid, "$\omega$" is the sinusoid frequency (equal to $2\pi$ radians per twelve (12) hours), and "t" is the current time. Using a common least squares technique and the data collected by the probes 148 and/or 150, the values of the estimated bias "b" and the estimated amplitude "c" of the sinusoid are estimated.

The differential group delay between the timing reference signal and the code signal is estimated in the satellite 102 without estimated group delay information being uploaded from a secondary source, such as a ground station. As such, a correction for position estimation can be determined on-board the satellite and transmitted directly to the receiver 106. In addition, the differential group delay estimation is a correction for both constant deviation and daily variation factors that contribute to inaccurate position estimations as the satellite orbits every twelve (12) hours and rotates 180°.

At block 208, estimated curve fit parameters are communicated in a navigation message to a navigation system-enabled receiving device that utilizes the curve fit equation as well as the estimated curve fit parameters (such as constant deviation and daily variation parameters) to determine the differential group delay for a position accuracy correction. For example, the satellite 102 can communicate the estimated bias "b" and the estimated amplitude "c" of the sinusoid in a navigation message to the navigation system-enabled receiving device 106 that includes the sinusoidal curve fit equation. The receiver 106 can then utilize the estimated bias "b" and the estimated amplitude "c" of the sinusoid to determine the estimated differential group delay "δ" for a position accuracy correction.

Figure 3:
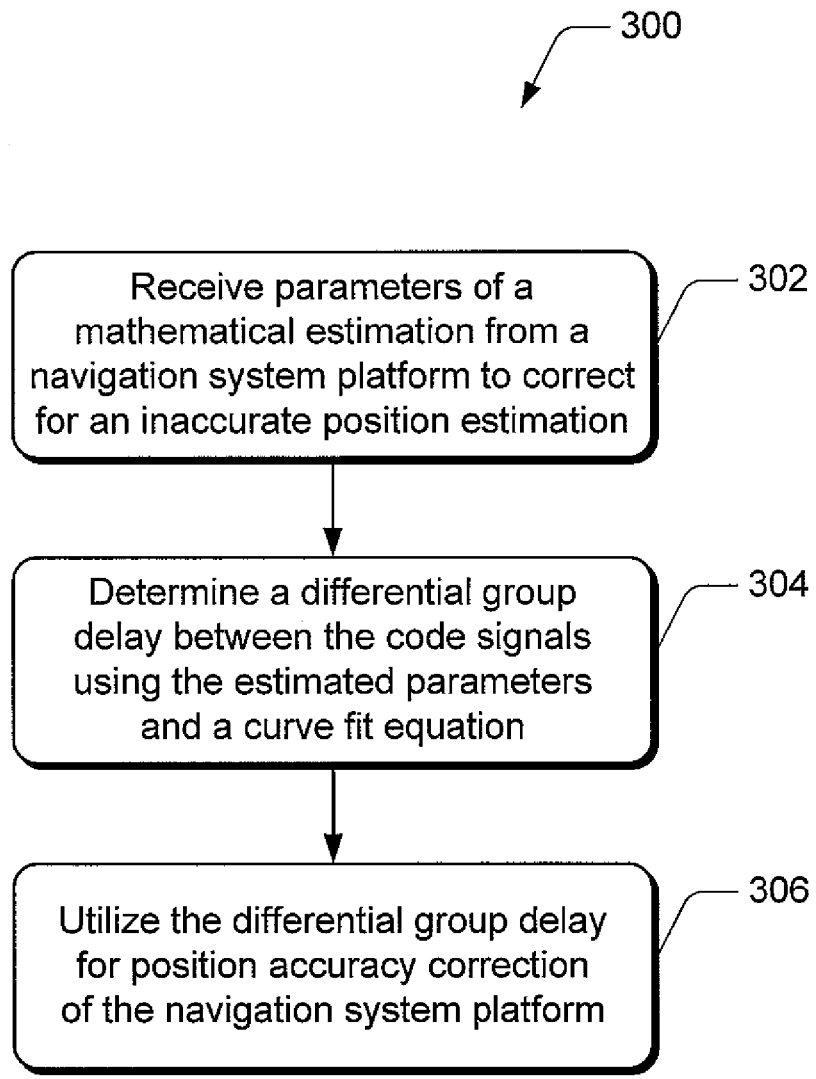
FIG. 3 illustrates exemplary method(s) for navigation signal group delay calibration.

FIG. 3 illustrates an exemplary method 300 for navigation signal group delay calibration and is described with reference to the exemplary environment 100 shown in FIG. 1. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 302, estimated parameters of a mathematical estimation are received from a navigation system platform to correct for an inaccurate position estimation that would result from one or more timing delays inherent in code signals generated in the navigation system platform. For example, code signals generated in the satellite navigation system platform 102 can be generated by the wide beam signal generation system 116 and/or the spot beam signal generation system 118. The platform delay calibration application 112 estimates the differential group delay between the code signals with a curve fit estimation, such as a sinusoidal curve fit equation, any other suitable curve fit equation, or mathematical estimation. The estimated parameters of the curve fit estimation are received by the receiver 106 from the navigation system platform 102.

At block 304, a differential group delay between the code signals using the estimated parameters and a curve fit equation is determined. For example, the receiver delay calibration airborne platform 114 determines the differential group delay between the code signals utilizing a sinusoidal curve fit equation: δ=b+c sin(ωt), and the received parameters, such as an estimated bias of the sinusoid "b" and an estimated amplitude of the sinusoid "c" received in a navigation message from the satellite navigation system platform 102. At block 306, the differential group delay is utilized for position accuracy correction of the satellite.

Figure 4:
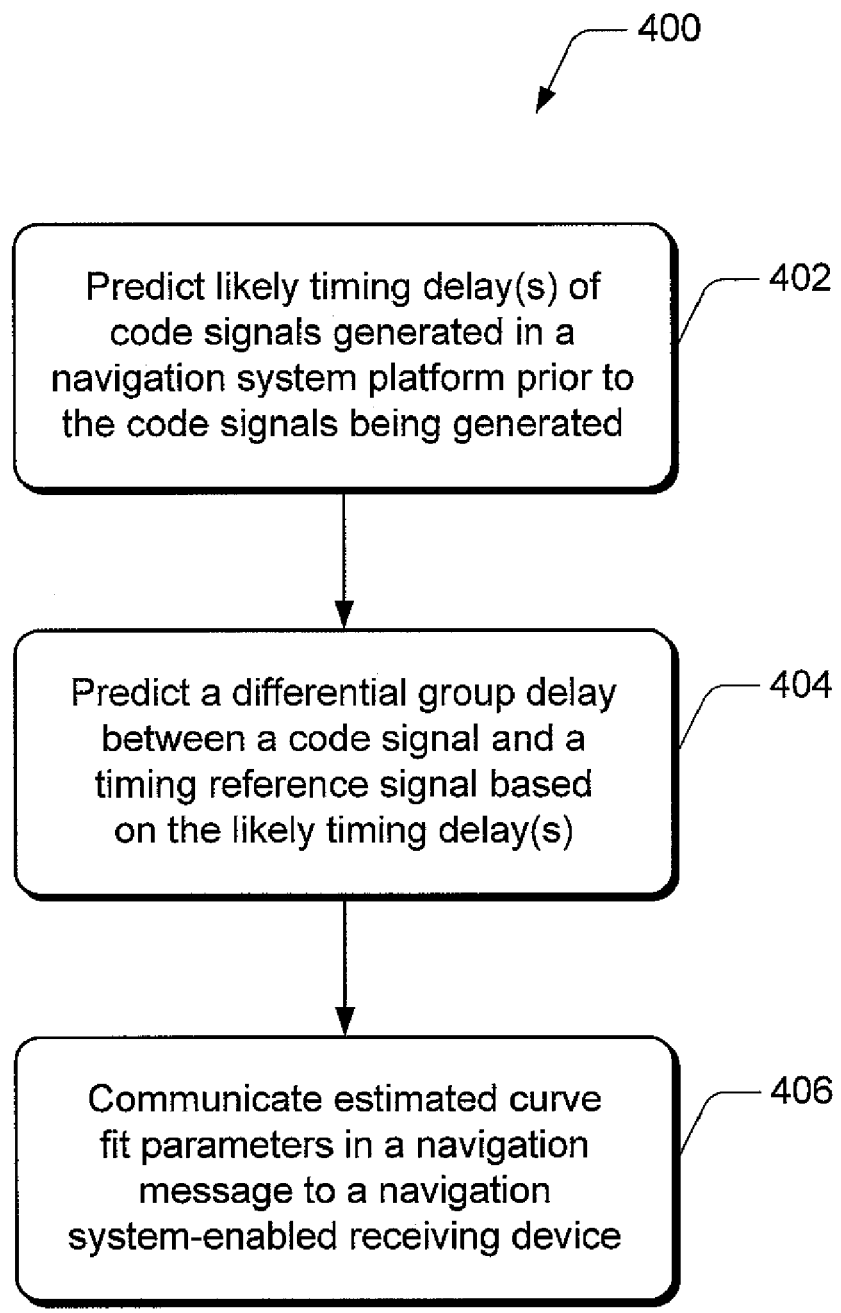
FIG. 4 illustrates exemplary method(s) for navigation signal group delay calibration.

FIG. 4 illustrates an exemplary method 400 for navigation signal group delay calibration and is described with reference to the exemplary environment 100 shown in FIG. 1. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 402, likely timing delay(s) of code signals generated in a navigation system platform are predicted prior to the code signals being generated. For example, clock adder bias and code signal generation timing delays are "adders" that contribute to a cumulative group delay between generated code signals. In an embodiment, the timing delay adders can be pre-determined and accounted for when real-time processing and bandwidth would be limited.

At block 404, a differential group delay between a code signal and a timing reference signal is predicted based on the likely timing delay(s). For example, the differential group delay is estimated with the platform delay calibration application 112 utilizing a mathematical estimation, such as a sinusoidal curve fit equation, in the satellite navigation system platform 102 to correct for an inaccurate position estimation that would result from the one or more likely timing delays.

At block 406, estimated curve fit parameters are communicated in a navigation message to a navigation system-enabled receiving device. For example, the navigation system platform 102 can communicate the estimated bias "b" and the estimated amplitude "c" of the sinusoid in a navigation message to the navigation system-enabled receiving device 106 that may also include the sinusoidal curve fit equation. The receiver 106 can then utilize the estimated bias "b" and the estimated amplitude "c" of the sinusoid to determine the estimated differential group delay "δ" for a position accuracy correction.

Figure 5:
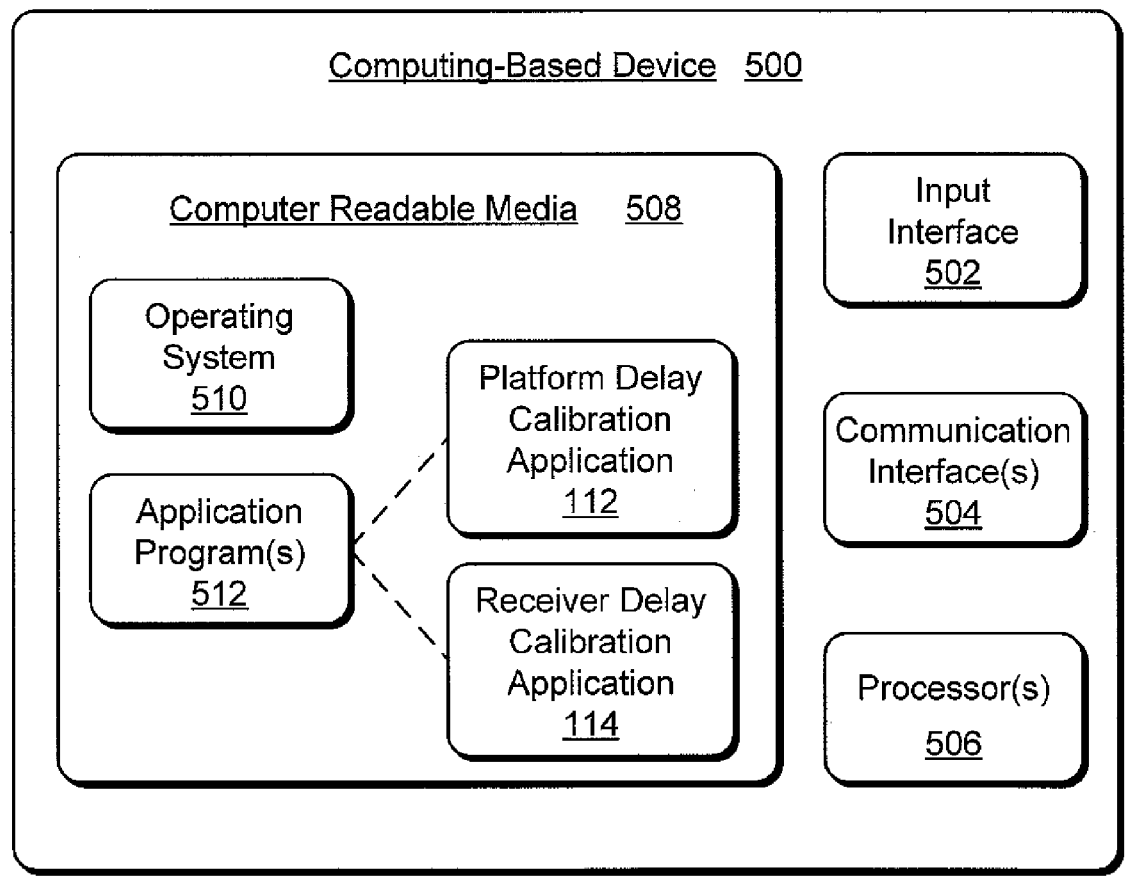
FIG. 5 illustrates various components of an exemplary computing-based device in which embodiments of navigation signal group delay calibration can be implemented.

FIG. 5 illustrates various components of an exemplary computing-based device 500 which can be implemented as any form of computing or electronic device in which embodiments of navigation signal group delay calibration can be implemented. For example, the computing-based device 500 can be implemented to include any one or combination of components described with reference to the exemplary environment 100 (FIG. 1).

The computing-based device 500 includes an input interface 502 by which any type of data inputs can be received. Device 500 further includes communication interface(s) 504 which can be implemented as any one or more of a serial and/or parallel interface, a wireless interface, any type of network interface, and as any other type of communication interface.

The computing-based device 500 also includes one or more processors 506 (e.g., any of microprocessors, controllers, and the like) which process various computer executable instructions to control the operation of computing-based device 500, to communicate with other electronic and computing devices, and to implement embodiments of navigation signal group delay calibration. Computing-based device 500 can also be implemented with computer readable media 508, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 508 provides data storage mechanisms to store various information and/or data such as software applications and any other types of information and data related to operational aspects of computing-based device 500. For example, an operating system 510 and/or other application programs 512 can be maintained as software applications with the computer readable media 508 and executed on processor(s) 506 to implement embodiments of navigation signal group delay calibration. For example, the platform delay calibration application 112 and the receiver delay calibration application 114 can each be implemented as a software application component.

In addition, although the platform delay calibration application 112 and the receiver delay calibration application 114 are each described as separate applications, each of the applications can themselves be implemented as several component modules or applications distributed to each perform one or more functions of navigation signal group delay calibration.

Although embodiments of navigation signal group delay calibration have been described in language specific to structural features and/or methods, it is to be understood that the subject of the appended claims is not necessarily limited to the specific features or methods described. Rather, the specific features and methods are disclosed as exemplary implementations of navigation signal group delay calibration.

The invention claimed is:

1. A method, comprising:
    measuring a code signal generated in a navigation system platform, the code signal including one or more timing delays, wherein the navigation system platform is an airborne entity or orbital satellite;
    measuring an additional code signal generated in the navigation system platform, the additional code signal being designated as a timing reference signal; and
    estimating a differential group delay between the code signal and the timing reference signal, the differential group delay being mathematically estimated by a calibration resource in the navigation system platform to correct for an inaccurate position estimation that would result from the one or more timing delays.

2. A method as recited in claim 1, wherein the differential group delay between the timing reference signal and the code signal is mathematically estimated utilizing a curve fit equation.

3. A method as recited in claim 2, further comprising communicating estimated curve fit parameters in a navigation message to a navigation system-enabled receiving device that utilizes the curve fit equation as well as the estimated curve fit parameters to determine the differential group delay for a position accuracy correction.

4. A method as recited in claim 2, further comprising communicating an constant deviation and daily variation parameters in a navigation message to a navigation system-enabled receiving device that utilizes the curve fit equation as well as the constant deviation and the daily variation parameters to determine the differential group delay for a position accuracy correction.

5. A method as recited in claim 2, further comprising communicating an estimated bias and an estimated amplitude of the curve fit equation in a navigation message to a GPS-enabled receiving device that utilizes the curve fit equation as well as the estimated bias and the estimated amplitude to determine the differential group delay for a position accuracy correction.

6. A method as recited in claim 1, wherein the differential group delay between the timing reference signal and the code signal is estimated in the navigation system platform without estimated group delay information uploaded from a secondary source.

7. A method as recited in claim 1, wherein the navigation system platform is a GPS satellite, and wherein the code signal is generated by a wide beam signal generation system and the additional code signal is generated by a spot beam signal generation system in the GPS satellite.

8. A method as recited in claim 1, wherein the code signal and the additional code signal are generated in the navigation system platform that includes at least one of: a wide beam signal generation system; a spot beam signal generation system.

9. A method as recited in claim 1, wherein the timing reference signal is at least one of: a code signal generated by an Earth coverage signal generation system; a code signal generated by a spot beam signal generation system.

10. A method as recited in claim 1, wherein estimating the differential group delay is a correction for both constant deviation and daily variation factors that contribute to the inaccurate position estimation.

11. A method, comprising:
    receiving estimated parameters of a mathematical estimation from a navigation system platform to correct for an inaccurate position estimation that would result from one or more timing delays inherent in code signals generated in the navigation system platform, wherein the navigation system platform is an airborne entity or orbital satellite, and wherein the estimated parameters are determined by a resource aboard the navigation system platform;
    determining a differential group delay between the code signals using the estimated parameters and a curve fit equation; and
    utilizing the differential group delay for position accuracy correction of the navigation system platform.

12. A method as recited in claim 11, wherein the estimated parameters are constant deviation and daily variation parameters received in a navigation message from the navigation system platform.

13. A method as recited in claim 11, wherein the code signals generated in the navigation system platform are generated by at least one of: a wide beam signal generation system; a spot beam signal generation system.

14. A method as recited in claim 11, wherein determining the differential group delay is a correction for both constant deviation and daily variation factors that contribute to the inaccurate position estimation.

15. A method, comprising:
    predicting one or more likely timing delays of code signals generated in a navigation system platform prior to the code signals being generated, the navigation system platform defined by an airborne entity or orbital satellite; and
    predicting a differential group delay between a code signal and a timing reference signal based on the one or more likely timing delays, the differential group delay being estimated utilizing a mathematical estimation determined by a calibration resource aboard the navigation system platform to correct for an inaccurate position estimation that would result from the one or more likely timing delays.

16. A method as recited in claim 15, wherein the differential group delay between the timing reference signal and the code signal is mathematically estimated utilizing a curve fit equation.

17. A method as recited in claim 16, further comprising communicating estimated curve fit parameters in a navigation message to a navigation system-enabled receiving device that utilizes the curve fit equation as well as the estimated curve fit parameters to determine the differential group delay for a position accuracy correction.

18. A method as recited in claim 16, further comprising communicating an estimated bias and an estimated amplitude in a navigation message to a navigation system-enabled receiving device that utilizes the curve fit equation as well as the estimated bias and the estimated amplitude to determine the differential group delay for a position accuracy correction.

19. A method as recited in claim 15, wherein the timing reference signal is at least one of: a code signal of an Earth coverage navigation system; a code signal of a spot beam navigation system.

20. A method as recited in claim 15, wherein estimating the differential group delay is a correction for both constant deviation and daily variation factors that would contribute to the inaccurate position estimation.

* * * * *